(12) United States Patent
Gauthier

(10) Patent No.: US 7,290,972 B2
(45) Date of Patent: Nov. 6, 2007

(54) SCREW ANCHOR FOR FRIABLE MATERIAL

(75) Inventor: Alain Gauthier, Saint Jean de Muzols (FR)

(73) Assignee: Societe de Prospection et d'Inventions Techniques Spit, Bourg les Valence (FR)

( * ) Notice: Subject to any disclaimer, the term of this patent is extended or adjusted under 35 U.S.C. 154(b) by 6 days.

(21) Appl. No.: 10/764,571

(22) Filed: Jan. 27, 2004

(65) Prior Publication Data

US 2005/0008450 A1 Jan. 13, 2005

(30) Foreign Application Priority Data

Jan. 29, 2003 (FR) .................................. 03 00999

(51) Int. Cl.
*F16B 25/10* (2006.01)
*F16B 39/00* (2006.01)
*F16B 35/00* (2006.01)

(52) U.S. Cl. ................. 411/387.1; 411/387.2; 411/387.3; 411/387.4; 411/387.5; 411/387.6; 411/387.7; 411/387.8; 411/389; 411/107

(58) Field of Classification Search ..... 411/387–387.8, 411/389, 107
See application file for complete search history.

(56) References Cited

U.S. PATENT DOCUMENTS

| | | | | |
|---|---|---|---|---|
| 2,600,286 A | * | 6/1952 | Weiland | 408/211 |
| 3,395,603 A | * | 8/1968 | Skierski | 411/387.8 |
| 3,578,762 A | * | 5/1971 | Siebol et al. | 411/387.6 |
| 3,592,555 A | * | 7/1971 | Mackey, Sr. | 408/225 |
| 3,738,218 A | * | 6/1973 | Gutshall | 411/387.7 |
| 3,789,725 A | * | 2/1974 | Lindstrom | 411/387.7 |
| 3,832,931 A | | 9/1974 | Talan | 85/83 |
| 4,028,987 A | * | 6/1977 | Wilson | 411/387.2 |
| 4,157,674 A | * | 6/1979 | Carlson et al. | 411/389 |
| 4,209,275 A | * | 6/1980 | Kim | 408/211 |
| 4,222,689 A | * | 9/1980 | Fujiwara | 411/387.8 |
| D260,525 S | * | 9/1981 | Lassiter | D15/139 |
| 4,323,326 A | * | 4/1982 | Okada et al. | 411/412 |
| 4,330,229 A | * | 5/1982 | Croydon | 408/212 |
| 4,529,341 A | * | 7/1985 | Greene | 408/212 |
| 4,781,506 A | * | 11/1988 | Roberts et al. | 411/387.8 |
| 4,878,788 A | * | 11/1989 | Wakihira et al. | 408/230 |
| 4,963,059 A | * | 10/1990 | Hiyama | 407/60 |
| 4,968,193 A | * | 11/1990 | Chaconas et al. | 408/211 |
| 5,056,967 A | * | 10/1991 | Hageman | 408/230 |
| 5,382,195 A | * | 1/1995 | Hiler | 470/9 |
| 5,413,444 A | * | 5/1995 | Thomas et al. | 411/387.1 |
| 5,442,979 A | * | 8/1995 | Hsu | 76/108.6 |

(Continued)

FOREIGN PATENT DOCUMENTS

EP 0 165 674 A1 12/1985

(Continued)

*Primary Examiner*—Katherine Mitchell
*Assistant Examiner*—David C Reese
(74) *Attorney, Agent, or Firm*—Lowe, Hauptman, Ham & Berner

(57) ABSTRACT

A screw anchor includes a roughly cylindrical body (1) with a drilling portion (3) provided, at its free end, with drilling teeth (14-16), at the other end of the body, a bearing flange (5) and an external screw thread (7). The drilling portion (3) is configured as a portion of a drill bit.

22 Claims, 1 Drawing Sheet

U.S. PATENT DOCUMENTS

| | | | |
|---|---|---|---|
| 5,529,449 A * | 6/1996 | McSherry et al. | 411/31 |
| 5,649,796 A * | 7/1997 | Durney | 408/211 |
| 5,752,792 A * | 5/1998 | McSherry | 411/31 |
| 5,980,169 A * | 11/1999 | Hinch | 408/225 |
| 6,079,921 A * | 6/2000 | Gauthier et al. | 411/110 |
| 6,113,321 A * | 9/2000 | Mulroy et al. | 408/211 |
| 6,142,719 A * | 11/2000 | Daubinger et al. | 411/387.8 |
| 6,309,159 B1 * | 10/2001 | Weaver et al. | 411/387.5 |
| 6,312,432 B1 * | 11/2001 | Leppelmeier | 606/80 |
| 6,354,779 B1 * | 3/2002 | West et al. | 411/80.1 |
| 6,398,785 B2 * | 6/2002 | Carchidi et al. | 606/73 |
| 6,402,448 B1 * | 6/2002 | Dicke | 411/387.5 |
| 6,857,832 B2 * | 2/2005 | Nygård | 408/211 |

FOREIGN PATENT DOCUMENTS

| | | |
|---|---|---|
| EP | 1 036 947 A2 | 9/2000 |

* cited by examiner

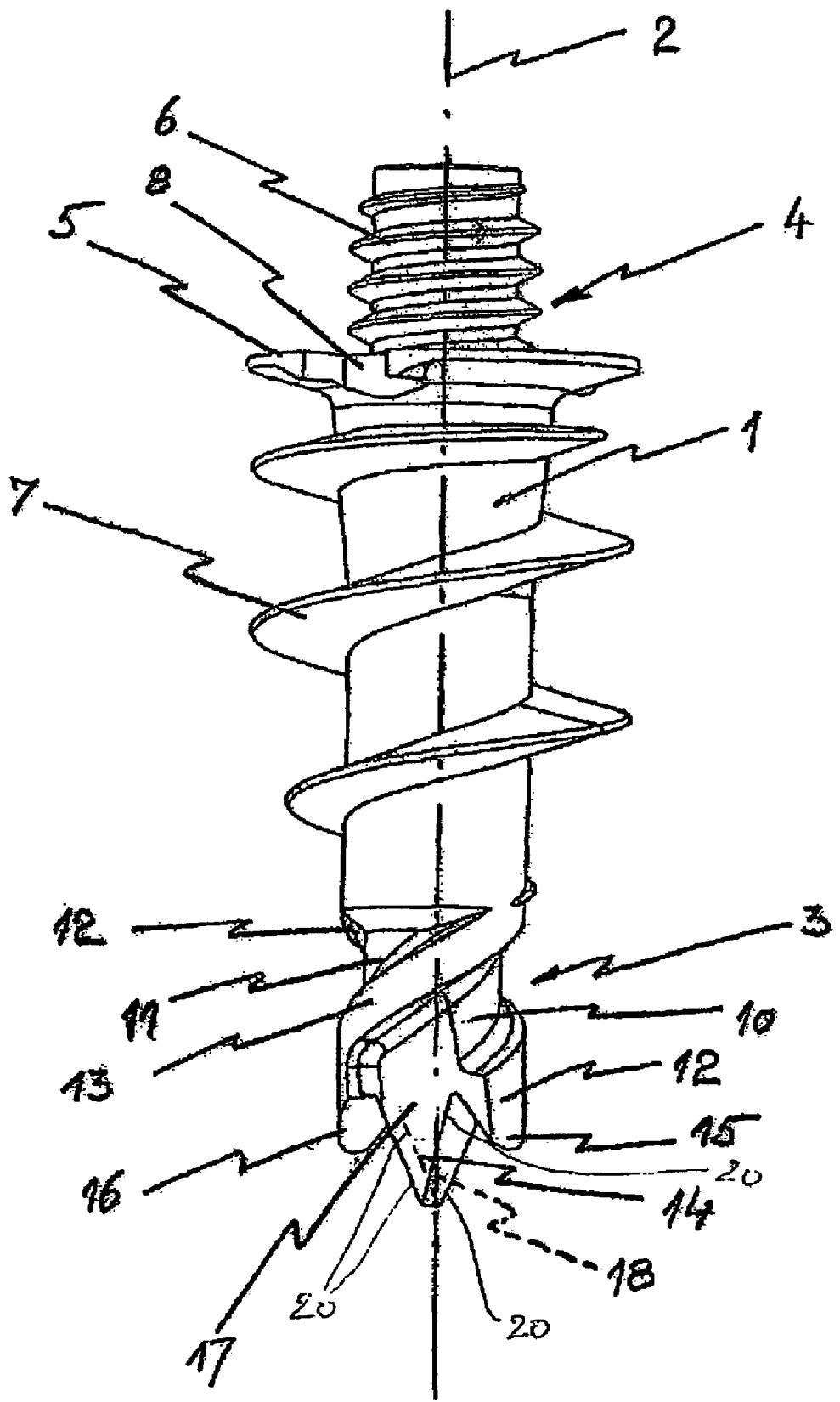

സ്ക്രൂ ANCHOR FOR FRIABLE MATERIAL

SCREW ANCHOR FOR FRIABLE MATERIAL

TECHNICAL FIELD

The invention relates to a screw anchor for friable material, such as a dry partition panel for example of the type known under the registered trade name of "Placoplâtre".

More specifically, the invention relates to a screw anchor for friable material comprising a roughly cylindrical body with a drilling end and, at the other end, a bearing flange and a screw thread.

BACKGROUND ART

To insert such a screw anchor into a support made of friable material, to continue with this example, all that is necessary is for the screw anchor to be screwed into the support without it being necessary beforehand to drill a hole in the support, as is often needed with numerous other screw anchors. By virtue of this, fitting is greatly simplified.

Once the screw anchor has been anchored in the support, in order to fix a piece to the support, either a fastener is introduced into the bore of the body of the screw anchor, of the screw anchor body is hollow and pierced with such a bore, or a nut is screwed onto the threaded shank portion that extends the screw anchor body beyond its bearing flange, if such is the case.

A screw anchor of the type defined hereinabove is known from document EP 0165 674.

In one of the screw anchors of this document, the drilling end consists of a flat blade of a certain length with, at its free end, drilling teeth, the utility of such an arrangement being that the actual drilling operation is more or less completed before the external screw thread of the screw anchor begins to tap into the support material.

However, it sometimes happens that support panels, even those made of friable material, are slightly too hard for such screw anchors and therefore give rise to the risk either of breaking the drilling blade or of making it impossible to anchor the screw anchors.

U.S. Pat. No. 6,354,779 teaches a screw• anchor for friable material, comprising a roughly cylindrical body with a drilling portion provided, at its free end, with drilling teeth, at the other end of the body, a bearing flange and an external screw thread wound around the body in one direction, the drilling portion being configured as a portion of a drill bit.

However, the central tooth of the drill bit portion looks like a centering pointed cone, without any cutting edge, so that the anchor of this document, since the central tooth just pushes the material, has the drawback of a risk to blow up the panel.

SUMMARY OF THE INVENTION

The present invention aims to eliminate this risk.

To do that, the invention relates to a screw anchor for friable material, comprising a roughly cylindrical body with a drilling portion provided, at its free end, with drilling teeth, at the other end of the body, a bearing flange and an external screw thread wound around the body in one direction, the drilling portion being configured as a portion of a drill bit, characterized in that the drill bit portion has two helical flute in the same direction as the external screw thread which open each onto a flat surface forming the wall of a central drilling tooth and of one of two lateral drilling teeth, which is formed in a drill bit rib bordering the said flute on the downstream side.

It is a little as if the screw anchor with drilling blade of the prior art had been taken and its blade twisted in the same direction as the direction in which the external screw thread was wound, with perfect withstand during the drilling operation, even if the material is too hard, something which would otherwise have caused the blade to twist in the opposite direction.

To return to the analogy of the twisted drilling blade, it will be seen that the ribs of the drill bit portion could be likened to the two lateral cutting edges formed in the thickness of the blade.

BRIEF DESCRIPTION OF THE DRAWINGS

The invention will be better understood with the aid of the following description of the preferred embodiment of the screw anchor of the invention, with reference to the appended single FIGURE which depicts it in perspective.

The screw anchor depicted in the drawing comprises a roughly cylindrical body 1 of axis 2, with a drilling end 3 and a bearing and, in this instance, fastening, end 4.

DETAILED DESCRIPTION OF THE PREFERRED EMBODIMENTS

The bearing and fastening end 4 comprises a bearing flange 5 at the opposite end of the body 1 to the drilling end and beyond which there extends a threaded shank portion 6, with the same axis 2 as the screw anchor body 1 and an appreciably smaller diameter than the flange, intended to take a nut to fix, to the support in which the screw anchor is itself intended to be anchored, a piece through which this shank portion 6 passes.

An external screw thread 7 is wound around the screw anchor body, in this instance in the form of a right-hand thread, from the bearing flange 5, with a determined pitch, the screw thread 7 being spaced away from the flange 5 by at least one pitch. The external diameter of the screw thread 7 is roughly twice the diameter of the body 1.

The bearing flange 5 has two diametral recesses 8 to take two studs of a tool that turns the screw anchor in order to anchor it in the support.

The drilling end 3 is a drill bit portion with two flutes 10, 11 wound in the same direction as the screw thread 7, between two ribs 12, 13, one downstream and the other upstream of one, 10, of the flutes, and vice versa for the other, 11, of the flutes. At its free end, this drill bit portion 3 bears drilling teeth, in this instance a central tooth 14 and two shorter lateral teeth 15, 16. Each flute 10, 11 opens onto a flat surface 17, 18 forming the wall of the central tooth 14 and the wall of the lateral tooth 15, 16 formed in the corresponding downstream rib 12, 13 bordering the flute in question. The two flat surfaces 17, 18 of the central tooth 14 provide on this tooth four cutting edges 20 (only three of which are shown as visible in the FIGURE whereas the last one is shown a invisible) which enable, beyond the centering function of the anchor, assured by this tooth, to cut the material and not only to push it.

When the screw anchor is turned, therefore in this instance in the clockwise direction, the central tooth 14 holds the screw anchor on its axis 2, while the lateral teeth 15, 16 cut into the facing paper of the friable material support. Once the paper has been cut, the three teeth continue to drill a hole in the support while the screw anchor is being turned. Because the drilling end 3 is in the shape of a drill bit, it easily performs its drilling function without the risk of breakage, even in fairly hard material. Furthermore, the material dust created by the drilling are readily removed along the flutes 10, 11 before the screw thread 7 is introduced into the material and taps into it. Thanks to the cutting edges 20 of the central tooth 14, the downstream, in the driving direction of the anchor, covering paper of the panel, to keep considering this example of a dry wall, that is the one which is masked, is not blown up.

The invention claimed is:

1. A screw anchor for friable material, said anchor comprising
   a roughly cylindrical body;
   a drilling portion provided at a first free end of the body with drilling teeth;
   a bearing flange at a second end of the body; and
   an external screw thread extending around the body in a first direction;
   the drilling portion being configured as a portion of a drill bit, wherein the drill bit portion has two helical flutes which extend in the first direction, each of said flutes opening onto a respective flat surface forming walls of both a central drilling tooth and one of two lateral drilling teeth.

2. The anchor according to claim 1, further comprising a threaded shank portion that extends the body beyond the bearing flange.

3. The anchor according to claim 1, wherein the body is hollow and pierced with a bore.

4. The anchor according to claim 1, wherein said drilling portion further comprises two drill bit ribs bordering said flutes, each of said ribs forming one of said lateral drilling teeth.

5. The anchor according to claim 1, wherein an angle between said walls is zero.

6. The anchor according to claim 4, further comprising a threaded shank portion that extends the body beyond the bearing flange.

7. The anchor according to claim 4, wherein the body is hollow and pierced with a bore.

8. A screw anchor, comprising:
   a shank;
   a head formed at an upper end of said shank;
   a drilling portion formed at a lower end of said shank; and
   a plurality of external threads which helically extend in a first direction about said shank between said head and said drilling portion;
   wherein said drilling portion comprises:
   a central drilling tooth having opposing flat surfaces; and
   two helical flutes helically extending in the first direction, each of said flutes ending at one of said flat surfaces of said central drilling tooth; and
   wherein said drilling portion further comprises two lateral drilling teeth on opposite sides of said central drilling tooth, each of said lateral drilling teeth having a flat surface which is coplanar with one of the flat surfaces of said central drilling tooth.

9. The anchor of claim 8, wherein said drilling portion further comprises two drill bit ribs bordering said flutes, each of said ribs forming one of said lateral drilling teeth.

10. The anchor of claim 9, wherein each of said flat surfaces of the central drilling tooth extends laterally to define the flat surface of a first of said lateral drilling teeth, and the rib that forms a second of said lateral drilling teeth, defines a raised border of said central drilling tooth on said flat surface.

11. The anchor of claim 10, wherein each of said flat surfaces of the central drilling tooth extends laterally to define a flat surface of only one of said lateral drilling teeth.

12. The anchor of claim 11, wherein each of said flat surfaces of the central drilling tooth extends downwardly to an pointed end of said central drilling tooth which pointed end is a lowermost point of said anchor.

13. The anchor of claim 12, wherein each of said flutes ends abruptly at a respective flat surface of the central drilling tooth.

14. The anchor of claim 13, wherein said flat surfaces of the central drilling tooth define four cutting edges.

15. The anchor of claim 14, wherein the four cutting edges are essentially straight edges.

16. The anchor of claim 12, further comprising a threaded shank portion located above said head.

17. The anchor of claim 12, wherein said shank is hollow and has a bore.

18. A screw anchor, comprising:
   a shank;
   a head formed at an upper end of said shank;
   a drilling portion formed at a lower end of said shank; and
   a plurality of external threads which helically extend in a first direction about said shank between said head and said drilling portion;
   wherein said drilling portion comprises:
   a central drilling tooth having opposing flat surfaces; and
   two helical flutes helically extending in the first direction, each of said flutes ending at one of said flat surfaces of said central drilling tooth; and
   wherein said drilling portion further comprises two lateral drilling teeth on opposite sides of said central drilling tooth, each of said lateral drilling teeth having a flat surface which is a continuous extension of one of the flat surfaces of said central drilling tooth, and which extends seamlessly without interruption into said one of the flat surfaces of said central drilling tooth.

19. The anchor of claim 18, wherein each of said flat surfaces of the central drilling tooth extends downwardly to an pointed end of said central drilling tooth which pointed end is a lowermost point of said anchor.

20. The anchor of claim 18, wherein each of said flutes ends abruptly at a respective flat surface of the central drilling tooth.

21. The anchor of claim 18, wherein said flat surfaces of the central drilling tooth define four cutting edges.

22. The anchor of claim 21, wherein the four cutting edges are essentially straight edges.

* * * * *